United States Patent
Li (10) Patent No.: US 12,216,538 B2
(45) Date of Patent: Feb. 4, 2025

(54) STORAGE SYSTEM AND METHOD FOR HIDING ERROR CHECKING AND CORRECTING (ECC) ENCODING DELAY

(71) Applicant: METAX INTEGRATED CIRCUITS (SHANGHAI) CO., LTD., Shanghai (CN)

(72) Inventor: Ying Li, Shanghai (CN)

(73) Assignee: METAX INTEGRATED CIRCUITS (SHANGHAI) CO., LTD., Shanghai (CN)

( * ) Notice: Subject to any disclaimer, the term of this patent is extended or adjusted under 35 U.S.C. 154(b) by 8 days.

(21) Appl. No.: 18/273,031

(22) PCT Filed: Dec. 3, 2021

(86) PCT No.: PCT/CN2021/135510
§ 371 (c)(1),
(2) Date: Jul. 19, 2023

(87) PCT Pub. No.: WO2022/156386
PCT Pub. Date: Jul. 28, 2022

(65) Prior Publication Data
US 2024/0126645 A1    Apr. 18, 2024

(30) Foreign Application Priority Data
Jan. 20, 2021  (CN) .......................... 202110073485.7

(51) Int. Cl.
*G06F 11/10* (2006.01)
(52) U.S. Cl.
CPC ................ *G06F 11/1044* (2013.01)
(58) Field of Classification Search
CPC .................................................. G06F 11/1044
See application file for complete search history.

(56) References Cited

U.S. PATENT DOCUMENTS 5,005,174 A * 4/1991 Bruckert ............. G06F 11/1658
714/11
10,096,366 B2 * 10/2018 Akamine ............... G11C 16/08
(Continued)

FOREIGN PATENT DOCUMENTS

CN       102982849 A       3/2013
CN       103389924 A       11/2013
(Continued)

*Primary Examiner* — Chae M Ko
*Assistant Examiner* — Indranil Chowdhury (57) ABSTRACT

A storage system and method for hiding Error Checking and Correcting (ECC) encoding delay are disclosed. An output of a data register is configured to be two data streams. One data stream transmits an input write data and an ECC check code to the SRAM through an ECC encoding module and an intermediate write data register, and the other data stream inputs the input write data to a read data selector through a bypass register module through the intermediate write data register and the bypass register module. The other input of the read data selector is the data set whose errors have been checked and corrected by the ECC encoding error checking module which reads the data set from the SRAM. The read data selector is configured to transmit the selected input data to the read data register. According to the present disclosure, when data at the address is read right after the data is written to the address, the read data selector selects to output the write data received from the bypass register module; but when data is written to an address but data at an other address is read, the read data selector selects to output the data set whose errors have been checked and corrected by the ECC encoding error checking module which reads the data set from the SRAM.

16 Claims, 5 Drawing Sheets

(56) References Cited

U.S. PATENT DOCUMENTS

| | | | |
|---|---|---|---|
| 2004/0044943 A1 | 3/2004 | Jacquet et al. | |
| 2004/0237023 A1 | 11/2004 | Takahashi et al. | |
| 2012/0173951 A1* | 7/2012 | Kong | H03M 13/1515 |
| | | | 714/755 |
| 2014/0013184 A1* | 1/2014 | Takahashi | G06F 11/1008 |
| | | | 714/763 |
| 2015/0039844 A1 | 2/2015 | Kao et al. | |
| 2018/0091332 A1* | 3/2018 | Rothermel | H04L 1/0047 |
| 2019/0317855 A1* | 10/2019 | Prathapan | G06F 11/108 |
| 2020/0364129 A1* | 11/2020 | Das Sharma | G06F 11/3027 |
| 2020/0371867 A1* | 11/2020 | Imaizumi | G06F 11/1032 |
| 2020/0394103 A1* | 12/2020 | Schaefer | G06F 11/326 |
| 2022/0229724 A1* | 7/2022 | Bains | G06F 11/1072 |
| 2024/0361915 A1* | 10/2024 | Yano | G06F 12/0246 |
| 2024/0362114 A1* | 10/2024 | Kim | G06F 11/1016 |

FOREIGN PATENT DOCUMENTS

| | | | | |
|---|---|---|---|---|
| CN | 103886916 A | 6/2014 | | |
| CN | 104331252 A | 2/2015 | | |
| CN | 107195329 A | 9/2017 | | |
| CN | 108665940 A | 10/2018 | | |
| CN | 111831404 A | 10/2020 | | |
| EP | 3716490 A1 * | 9/2020 | | G06F 11/1032 |
| JP | S5760595 A | 4/1982 | | |

\* cited by examiner

STORAGE SYSTEM AND METHOD FOR HIDING ERROR CHECKING AND CORRECTING (ECC) ENCODING DELAY

RELATED APPLICATIONS

The application is the U.S. national phase of PCT/CN2021/135510 filed Dec. 3, 2021, which claims the benefit of CN202110073485.7 filed Jan. 20, 2021, each of which is incorporated herein by reference in its entirety.

FIELD OF THE INVENTION

The present disclosure relates to the field of computational data storage, and in particular to a storage system and method for hiding error checking and correcting (ECC) encoding delay.

BACKGROUND OF THE INVENTION

Reliability is highly required in high-performance computing servers. Data errors may be caused in data stored in a static random access memory (SRAM) due to external impact resulting from low voltages or cosmic rays. Therefore, an error checking and correcting (ECC) function is generally added before the SRAM stores the data, so as to both correct single-bit errors and detect multi-bit errors.

Figure 1:
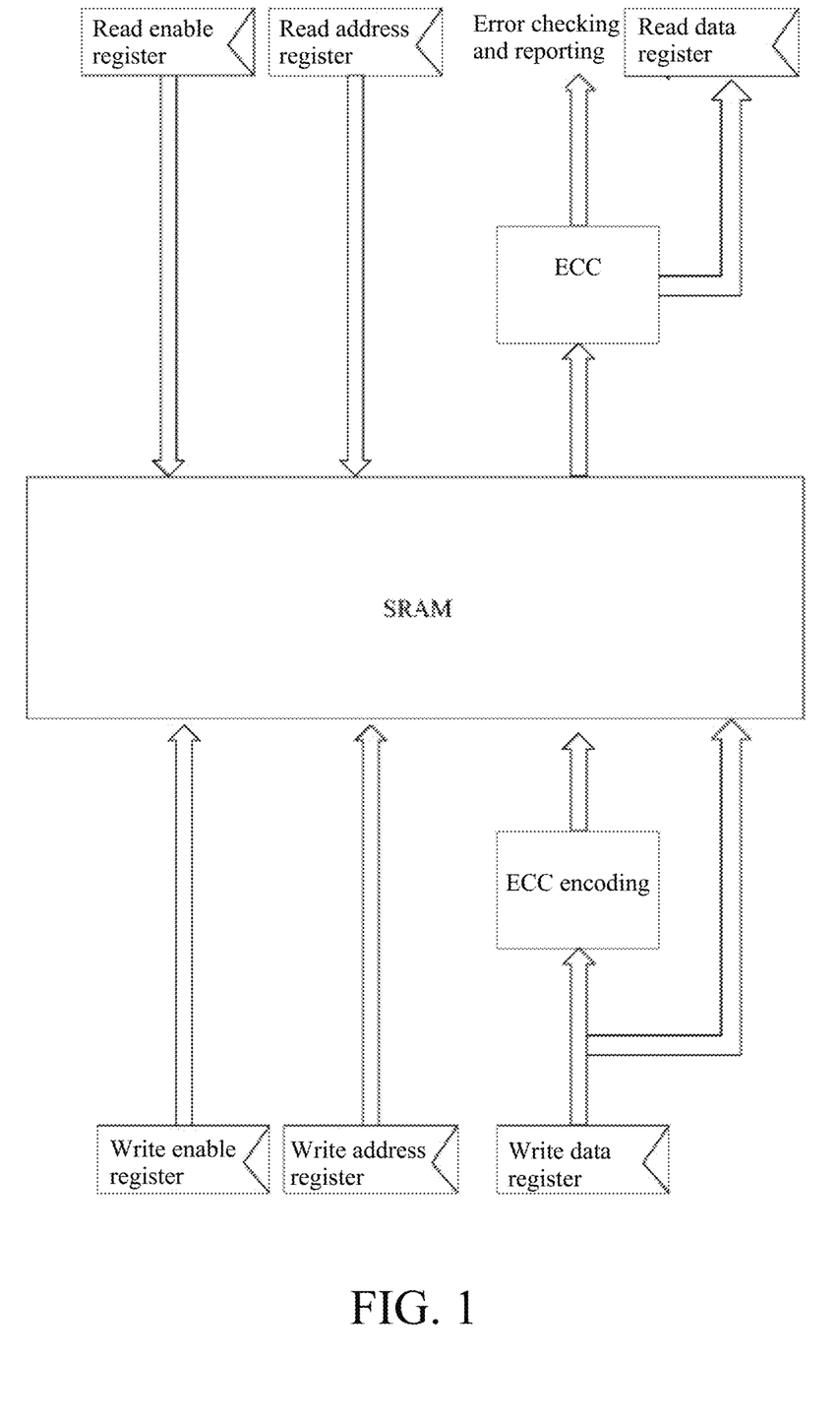
FIG. 1 shows an SRAM system with an error checking and correcting (ECC) function in related art.

FIG. 1 shows an SRAM storage system with an ECC function in related art. As shown in FIG. 1, during data writing, an ECC encoding module is added for the input of the SRAM, and the ECC encoding module generates a check bit according to a write data bit stored in a write data register, and then synchronously writes the check bit and the write data bit into the SRAM. During data reading, an ECC decoding error checking module simultaneously reads the write data bit and the check bit, checks errors of the write data bit in view of the check bit, directly corrects a single-bit error, and, if a multi-bit error is discovered, reports the multi-bit error.

However, after addition of the ECC function, a major challenge is caused for the timing sequence of the SRAM. The internal delay of the write end of the SRAM is longer than in the internal delay of the read end, and the space for a logic level of ECC encoding is reduced prior to the write end. Therefore, at the same operating frequency, a longer delay is caused to the timing sequence of the input by an ECC encoding logic, causing the problem of a data reading error when data at an address is read right after the data is written to the address back to back.

OBJECTS AND SUMMARY OF THE INVENTION

This present disclosure discloses a storage system and method for hiding error checking and correcting (ECC) encoding delay. By adding an intermediate register at an input and a bypass register logic module at a read end, ECC encoding delay can be effectively hid, the impact of the ECC encoding delay on the write delay of the SRAM can be avoided, and the problem of a data reading error when data at an address is read right after the data is written to the address back to back can be solved.

In some embodiments, the present disclosure discloses a storage system for hiding error checking and correcting (ECC) encoding delay, comprising:

an SRAM, which includes a data input, a write signal input, a read signal input and a data output;

a write register module, which may be configured to output a write signal;

an intermediate write register module, which may be configured to receive the write signal from the write data register module and then transmit the write signal to the write signal input of the SRAM;

a write data register, which may be configured to output write data;

an ECC coding module, which may be configured to receive the write data from the write data register and to generate an ECC check code in view of the write data;

an intermediate write data register, which may be configured to receive the write data from the write data register, receive the ECC check code from ECC coding module, and transmit the write data and the ECC check code to the data input of the SRAM;

a bypass register module, which may be configured to receive the write data from the intermediate write data register;

a read register module, which may be configured to transmit a read signal to the read signal input of the SRAM;

an ECC encoding error checking module, which may be configured to read a data set and the ECC check code from the SRAM through the data output of the SRAM, check the data set, and check errors in the data set in view of the data set and the ECC check code;

a read data selector, which may include a first input and a second input, wherein the first end may be used to receive the write data from the bypass register module; the second output may be used to receive from the ECC encoding error checking module the data set which is read from the SRAM; the read data selector may be used to output what is selected from one of what is received by the first input and what is received by the second input;

a read data register, which may be configured to receive what is outputted from the read data selector, wherein: when a timing sequence of the intermediate write register module aligns with a timing sequence of the intermediate write data register, the intermediate write register module is configured to transmit the write signal to the write signal input of the SRAM; the intermediate write data register is configured to, in concurrence with transmission to the write signal input of the SRAM of the write signal by the intermediate write register module, transmit the write data to the data input of the SRAM; and the read register module is configured to transmit the read signal to the read signal input of the SRAM; and in response to the read signal and the write signal, when data at an address is read right after the data is written to the address, the read data selector may be configured to select to output the write data received from the bypass register module; but when data is written to an address but data at an other address is read, the data set selector is configured to select to output the data set whose errors have been checked and corrected by the ECC encoding error checking module which reads the data set from the SRAM.

In a possible embodiment, an input of the ECC encoding error checking module may be electrically connected to the data output of the SRAM, and an output of the ECC encoding error checking module may be electrically connected to the second input of the read data selector.

In a possible embodiment, if a multi-bit error is discovered, the ECC encoding error checking module may report the multi-bit error.

In a possible embodiment, the write register module may include a write enable register and a write address register; the intermediate write register module may include an intermediate write enable register and an intermediate write address register; the write signal may include a write enable signal and a write address signal; the write signal input of the SRAM may further include a write enable signal input and a write address signal input; the write enable register may be electrically connected to the intermediate write enable register; the intermediate write enable register, which is used to input the write enable signal to the SRAM, may be electrically connected to the write enable signal input of the SRAM; the write address register may be electrically connected to the intermediate write address register; and the intermediate write address register, which is used to input the write address signal to the SRAM, may be electrically connected to the write address signal input of the SRAM.

In a possible embodiment, the bypass register module may include a primary bypass data register and a secondary bypass data register. The primary bypass data register may be configured to receive the write data from the intermediate write data register. The secondary bypass data register may be configured to receive the write data from the primary bypass data register. The first input of the read data selector may be used to receive the write data from the secondary bypass data register.

In a possible embodiment, an input of the primary bypass data register may be electrically connected to an output of the intermediate write data register, an input of the secondary bypass data register may be electrically connected to an output of the primary bypass data register, and an output of the secondary bypass data register may be electrically connected to the first input of the read data selector.

In a possible embodiment, when the timing sequence of the intermediate write register module aligns with a timing sequence of the intermediate write data register, the intermediate write register module may transmit the write data to the data input of the SRAM; and in concurrence with transmission to the write signal input of the SRAM of the write signal by the intermediate write register module, the intermediate write data register may transmit the write data to the data input of the SRAM.

In a possible embodiment, after the read register module transmits the read signal to the read signal input of the SRAM, the write data may be transmitted by the intermediate write data register to the primary bypass data register, transmitted by the primary bypass data register to the secondary bypass data register, and selected by the read data selector.

In a possible embodiment, the read register module may include a read enable register and a read address register; the read signal may include a read enable signal and a read address signal; the read signal input of the SRAM may further include a read enable signal input and a read address signal input; the read signal input which transmits the read signal to the SRAM may include a read enable signal input and a read address signal input for simultaneously transmitting the read enable signal and the read address signal to, respectively, the read enable signal input and the read address signal input of the SRAM.

In a possible embodiment, when a timing sequence of the intermediate write register module aligns with a timing sequence of the intermediate write data register, determine whether the write address signal is identical to the read address signal; if it is, the read data selector may be configured to select to output the write data received from the bypass register module; but if it is not, the read data selector may be configured to select to output the data set whose errors have been checked and corrected by the ECC encoding error checking module which reads the data set from the SRAM.

According to other embodiments of the present disclosure, the present disclosure discloses a method for hiding error checking and correcting (ECC) encoding delay, the method may include the following steps:

S1) receiving a write signal;
S2) transmitting by an intermediate write register module the write signal;
S3) receiving write data;
S4) generating an ECC check code in view of the write data;
S5) transmitting by an intermediate write register the write data and the ECC check code to a data input of an SRAM;
S6) receiving from the intermediate write register the write data by a bypass register module;
S7) transmitting a read signal to a read signal input of the SRAM;
S8) reading a data set and the ECC check code from the SRAM through the data output of the SRAM;
S9) checking the data set and correcting errors in the data set in view of the read data set and the ECC check code;
S10) receiving from the bypass register module the write data; and
S11) receiving the data set whose errors have been checked and corrected and read from the SRAM,
wherein when a timing sequence of the intermediate write register module aligns with a timing sequence of the intermediate write data register, the intermediate write register module transmits the write data to a data input of the SRAM; and in concurrence with transmission to the write signal input of the SRAM of the write signal by the intermediate write register module, the intermediate write data register transmits the write data to a data input of the SRAM;
when a timing sequence of the intermediate write register module aligns with a timing sequence of the intermediate write data register, the read signal may be transmitted to a read signal input of the SRAM;
in response to the write signal and the read signal, when data at an address is read right after the data is written to the address, selecting to output the write data received from the bypass register module; but when data is written to an address but data at an other address is read, selecting to output the data set whose errors have been checked and corrected by the ECC encoding error checking module which reads the data set from the SRAM.

In a possible embodiment, S9 may further include: if a multi-bit error is discovered, reporting the multi-bit error.

In a possible embodiment, the intermediate write register module may include an intermediate write enable register and an intermediate write address register; the write signal includes a write enable signal and a write address signal; the write signal input of the SRAM may further include a write enable signal input and a write address signal input. S2 may further include: transmitting by the intermediate write enable register the write enable signal to the write enable signal input of the SRAM; and transmitting by the intermediate write address register the write address signal to the write address signal input of the SRAM.

In a possible embodiment, the bypass register module may include a primary bypass data register and a secondary bypass data register. The write data may be received from the intermediate write data register by the primary bypass data register, and the write data may be received from the primary bypass data register by the secondary bypass data register. S6 may further include: receiving the write data from the secondary bypass data register.

In a possible embodiment, after transmitting the read signal to the read signal input of the SRAM, the write data may be transmitted by the intermediate write data register to the primary bypass data register, by the primary bypass data register to the secondary bypass data register, and selected by the read data selector.

In a possible embodiment, the read signal may include a read enable signal and a read address signal; the read signal input of the SRAM may further include a read enable signal input and a read address signal input. S7 may include simultaneously transmitting the read enable signal and the read address signal to, respectively, the read enable signal input and the read address signal input of the SRAM.

In a possible embodiment, when a timing sequence of the intermediate write register module aligns with a timing sequence of the intermediate write data register, determining whether the write address signal is identical to the read address signal; if it is, selecting to output the write data received from the bypass register module; but if it is not, selecting to output the data set whose errors have been checked and corrected by the ECC encoding error checking module which reads the data set from the SRAM.

According to the present disclosure, the output of the write data register may be configured to be two data streams. One data stream may transmit the input write data and the ECC check code to the SRAM through the ECC encoding module and the intermediate write data register; and the other data stream may input the input write data to a read data selector through the bypass register module through the intermediate write data register and the bypass register module. The other input of the read data selector may be the data set whose errors have been checked and corrected by the ECC encoding error checking module which reads the data set from the SRAM. The read data selector may be configured to transmit the selected input data to the read data register. The write register module may be electrically connected to the intermediate write register module to transmit a write signal to the SRAM. The read register module transmits a read signal to the SRAM. According to the present disclosure, when data at the address is read right after the data is written to the address, the read data selector selects to output the write data received from the bypass register module; but when data is written to an address but data at an other address is read, the read data selector selects to output the data set whose errors have been checked and corrected by the ECC encoding error checking module which reads the data set from the SRAM. Therefore, by adopting the storage system and method of the present disclosure, ECC encoding delay can be effectively hid, the impact of the ECC encoding delay on the write delay of the SRAM can be avoided, and the problem of a data reading error when data at an address is read right after the data is written to the address can be solved.

The following provides the detailed description of the embodiments in combination with the figures to detail other features and aspects of the present disclosure.

BRIEF DESCRIPTION OF FIGURES

The figures provided in the specification and constituting a part of the specification detail the exemplary embodiments, features and aspects of the present disclosure together with the specification, and used to explain the principle of the present disclosure.

DETAILED DESCRIPTION OF THE EMBODIMENTS

The following provides the detailed description of the exemplary embodiments, features and aspects of the present disclosure in combination with the figures. In the figures, same sign represents same or similar components. Though all aspects of the embodiments are shown in the figures, the figures are not provided in proportion unless otherwise specified.

For the purpose of the specification, the special term "exemplary" shall mean "illustrative, explanatory and descriptive", and the "exemplary" embodiments shall not be considered superior to or better than other embodiments.

Additionally, numerous specific details are given in the following embodiments to better illustrate the present disclosure. Those skilled in the art should understand that the present disclosure can be realized without some specific details. The methods, means, components and circuits that are well known to those skilled in the art are not detailed in some embodiments to highlight the subject matter of the present disclosure.

Figure 2:
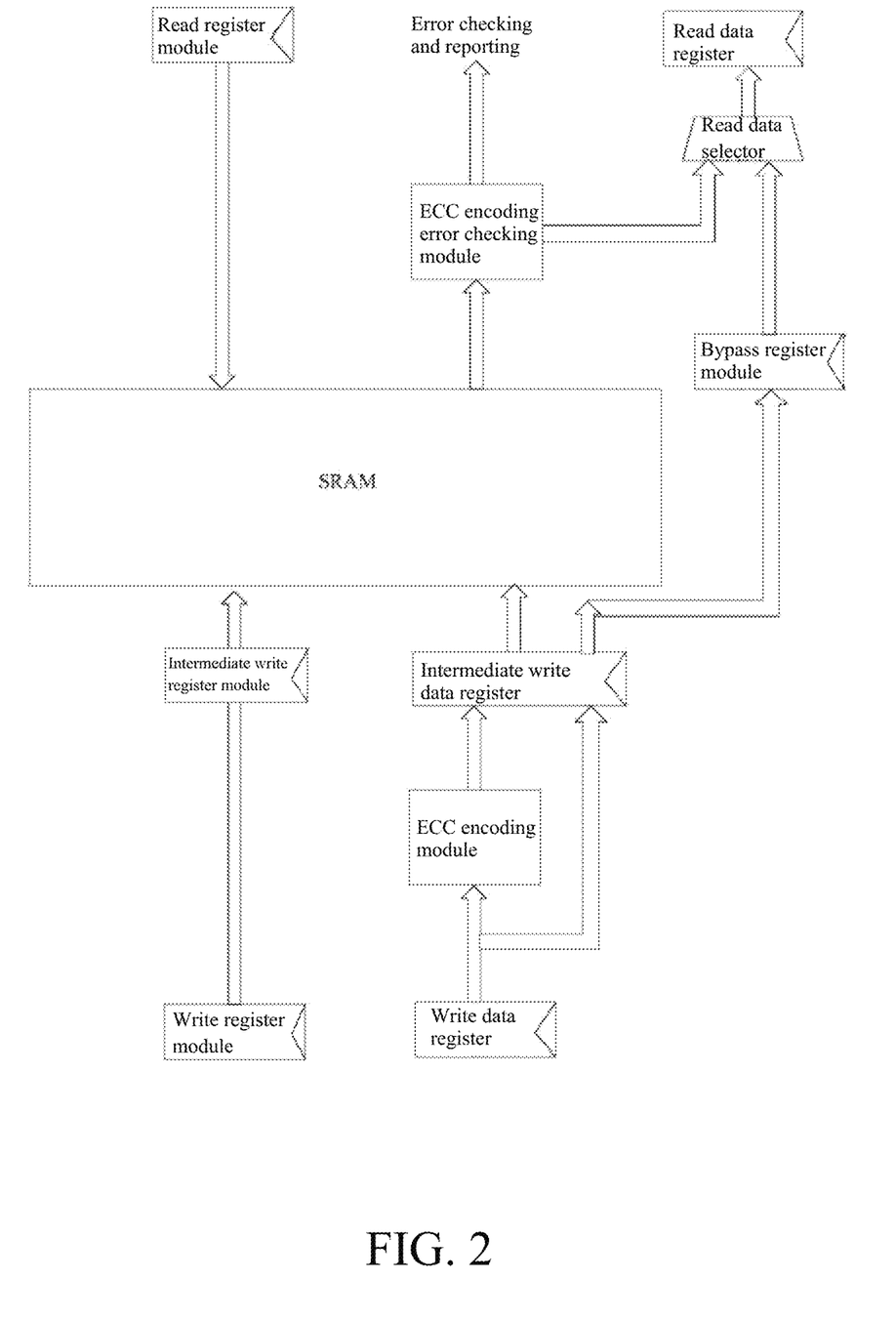
FIG. 2 shows a structure diagram of a storage system for hiding ECC encoding delay provided in an embodiment I according to the present disclosure.

FIG. 2 shows a structure diagram of a storage system for hiding error checking and correcting (ECC) encoding delay provided in an embodiment according to the present disclosure. As shown in FIG. 2, the system may include: a write data register, an intermediate write data register, an ECC encoding module, a write register module, an intermediate write register module, a bypass register module, an SRAM, a read data selector, a read register module, a read data register and an ECC encoding error checking module.

Specifically, as shown in FIG. 2, the SRAM may include a data input, a write signal input, a read signal input and a data output.

The write register module outputs a write signal. The intermediate write register module receives the write signal from the write register module, and transmits the write signal to the write signal input of the SRAM.

The write data register outputs the write data. The ECC encoding module receives the write data from the write data register, and generates an ECC check code according to the write data. The intermediate write data register receives the write data from the write data register and the ECC check code from the ECC encoding module, and transmits the write data and the ECC check code to the data input of the SRAM.

The bypass register module receives from the intermediate write data register the write data.

The read register module transmits the read signal to the read signal input of the SRAM.

The ECC encoding error checking module reads a data set and the ECC check code from the SRAM through the data output of the SRAM, checks the data set, and corrects errors of the data set in view of the data set and the ECC check code.

The read data selector includes a first input and a second input. The first input is used to receive the write data from the bypass register module, and the second input is used to receive from the ECC encoding error checking module the data set which is read from the SRAM. The read data selector selects to output what is selected from one of what is received by the first input and what is received by the second input.

The read data register receives selected data from the read data selector.

Specifically, when a timing sequence of the intermediate write register module aligns with a timing sequence of the intermediate write data register, the intermediate write register module transmits the write data to the data input of the SRAM; and in concurrence with transmission to the write signal input of the SRAM of the write signal by the intermediate write register module, the intermediate write data register transmits the write data to the data input of the SRAM.

On the other hand, when a timing sequence of the intermediate write register module aligns with a timing sequence of the intermediate write data register, the read register module transmits the read signal to the read signal input of the SRAM.

When data at an address is read right after the data is written to the address, the read data selector selects to output the write data received from the bypass register module. When data is written to an address but data at an other address is read, the read data selector selects to output the data set whose errors have been checked and corrected by the ECC encoding error checking module which reads the data set from the SRAM.

As shown in FIG. 2, the output of the write data register is configured to be two data streams. The first data stream is electrically connected to the intermediate write data register through the ECC encoding module. The second data stream is electrically connected to the bypass register module through the intermediate write data register. The intermediate write data register is electrically connected to the data input of the SRAM, and may be configured to transmit the ECC check code of s write data bit of the write data register to the intermediate write data register, and synchronously transmit the write data directly from the write data register and the ECC check code to the SRAM. In the second data stream, the write data directly from write data register is transmitted to the bypass register module. The bypass register module is electrically connected to the first input of the read data selector to further input the write data to the read data selector.

On the other hand, the write register module is electrically connected to the intermediate write register module, and the intermediate write register module is electrically connected to the write signal input of the SRAM, and may be configured to transmit the write signal to the SRAM. In a possible embodiment, when the timing sequence of the intermediate write register module aligns with the timing sequence of the intermediate write data register, the intermediate write register module transmits the write data to the data input of the SRAM; and in concurrence with transmission to the write signal input of the SRAM of the write signal by the intermediate write register module, the intermediate write data register transmits the write data to the data input of the SRAM.

The read register module is electrically connected to the read signal input of the SRAM, and may be configured to transmit the read signal to the SRAM. In a possible embodiment, the read register module is configured to transmit the read signal to the read signal input of the SRAM when the timing sequence of the intermediate write register module aligns with the timing sequence of the intermediate write data register.

As shown in FIG. 2, the input of the ECC encoding error checking module is electrically connected to the data output of the SRAM, and the output of the ECC encoding error checking module is electrically connected to the second input of the read data selector. The ECC encoding error checking module is configured to check and correct the error in the data set read from the SRAM, and transmit the data subjected to ECC to the read data selector. The read data selector is electrically connected to the read data register to transmit the selected input data to the read data register. The output of the ECC encoding error checking module is further connected to a server to, if a multi-bit error is discovered in read data, report the multi-bit error.

Figure 3:
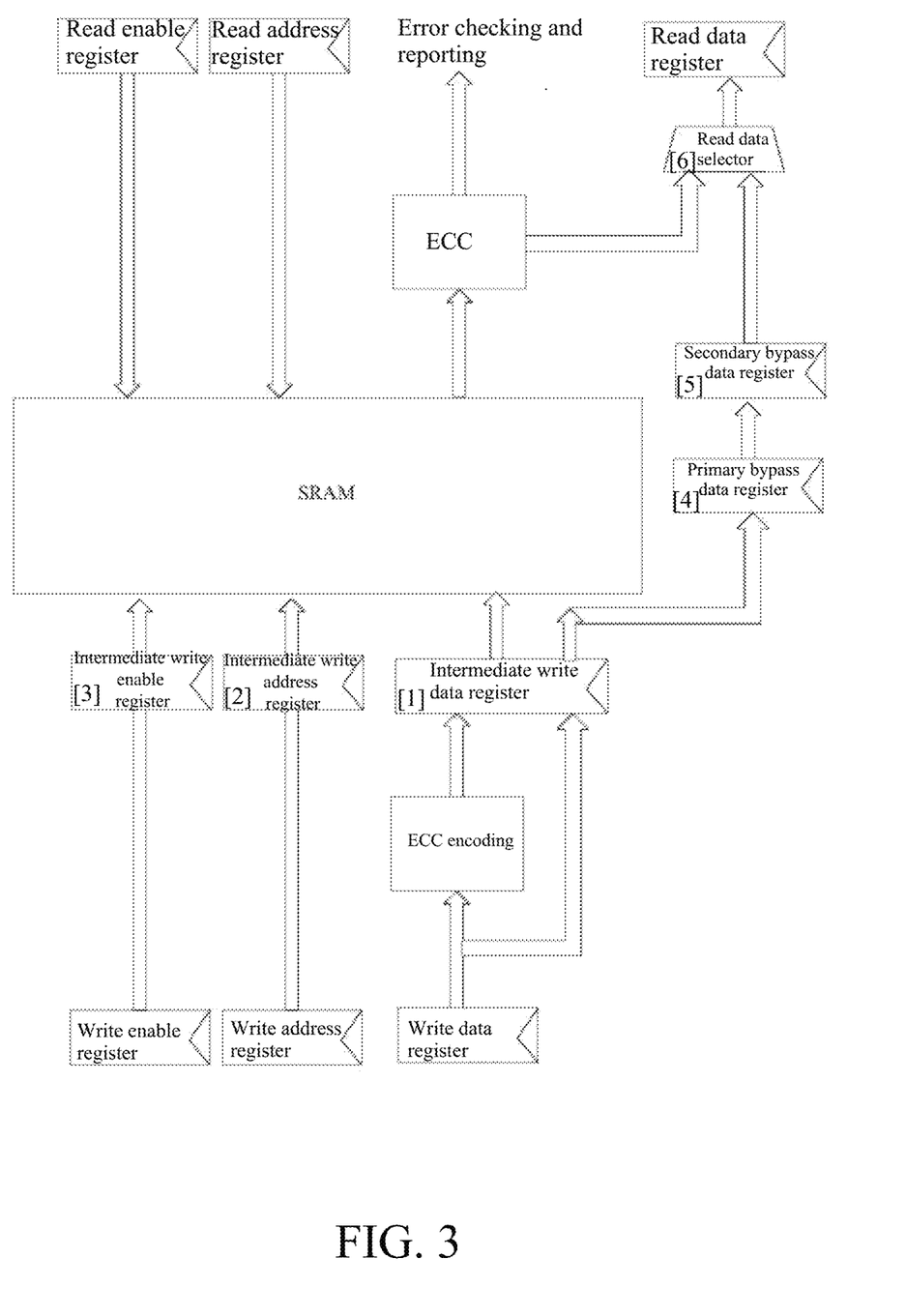
FIG. 3 shows a structure diagram of a storage system for hiding ECC encoding delay provided in another embodiment according to the present disclosure.

FIG. 3 shows a structure diagram of a storage system for hiding ECC encoding delay provided in another embodiment according to the present disclosure. As shown in FIG. 3, in the storage system as shown in FIG. 3, the bypass register module may include a primary bypass data register ([4] in FIG. 3) and a secondary bypass data register ([5] in FIG. 3). An input of the primary bypass data register is electrically connected to an output of the intermediate write data register ([1] in FIG. 3), and used to receive the write data from the intermediate write data register. An input of the secondary bypass data register is electrically connected to an output of the primary bypass data register, and used to receive the write data from the primary bypass data register. The output of the secondary bypass data register is electrically connected to the first input of the read data selector ([6] in FIG. 3) so that the first input of the read data selector receives the write data from the secondary bypass data register. Therefore, the write data in the write data register can be inputted into the read data selector through the intermediate write data register and the bypass register module, and can be further read by the read data register.

In a possible embodiment, after the read register module transmits the read signal to the read signal input of the SRAM, the write data is transmitted by the intermediate write data register to the primary bypass data register, and by the primary bypass data register to the secondary bypass data register, and selected by the read data selector.

In the storage system as shown in FIG. 3, the write register module may include a write enable register and a write address register. Correspondingly, the intermediate write register module may include an intermediate write enable register ([3] in FIG. 3) and an intermediate write address register ([2] in FIG. 3). The write signal may include a write enable signal and a write address signal. The write signal input of the SRAM further includes a write enable signal input and a write address signal input.

The write enable register is electrically connected to the intermediate write enable register, and the intermediate write enable register is electrically connected to the write enable signal input of the SRAM, and may be configured to input the write enable signal to the SRAM. The write address register is electrically connected to the intermediate write address register, and the intermediate write address register is electrically connected to the write address signal input of the SRAM, and may be configured to input the write address signal to the SRAM. Timing sequences of the write enable signal and the write address signal can be aligned with a timing sequence of the write data through the intermediate write register module, and the write enable signal and the write address signal are simultaneously input to the write input of the SRAM.

In the storage system as shown in FIG. 3, the read register module may include a read enable register and a read address register. The read signal includes a read enable signal and a read address signal. The read signal input of the SRAM further includes a read enable signal input and a read address signal input for simultaneously transmitting the read enable signal and the read address signal to, respectively, the read enable signal input and the read address signal input of the SRAM. Therefore, a reading operation can be performed when the read enable signal is valid.

In a possible embodiment, when the timing sequence of the intermediate write register module aligns with the timing sequence of the intermediate write data register, determine whether the write address signal is identical to the read address signal. If it is, the read data selector is configured to select to output the write data received from the bypass register module, and it is not, the read data selector is configured to select to output the data set whose errors have been checked and corrected by the ECC encoding error checking module which reads the data set from the SRAM.

In the embodiments shown in FIG. 2 and FIG. 3, the output of the write data register is configured to be two data streams. One data stream is electrically connected to the intermediate write data register through the ECC encoding module, and transmits the write data and the ECC check code to the SRAM. The other data stream is electrically connected to the bypass register module through the intermediate write data register, and inputs the write data to the read data selector by the bypass register module. The other input of the read data selector is a data set whose errors have been checked and corrected by the ECC encoding error checking module which reads the data set from the SRAM. The read data selector is configured to transmit the selected input data to the read data register. The write register module is electrically connected to the intermediate write register module to transmit the write signal to the SRAM. The read register module transmits the read signal to the SRAM. When data at the address is read right after the data is written to the address, the read data selector selects to output the write data received from the bypass register module to the read data register, but when data is written to an address but data at an other address is read, the read data selector selects to output the data set whose errors have been checked and corrected by the ECC encoding error checking module which reads the data set from the SRAM. Therefore, ECC encoding delay can be effectively hid, the impact of the ECC encoding delay on the write delay of the SRAM can be avoided, and the problem of a data reading error when data at an address is read right after the data is written to the address can be solved.

Figure 4:
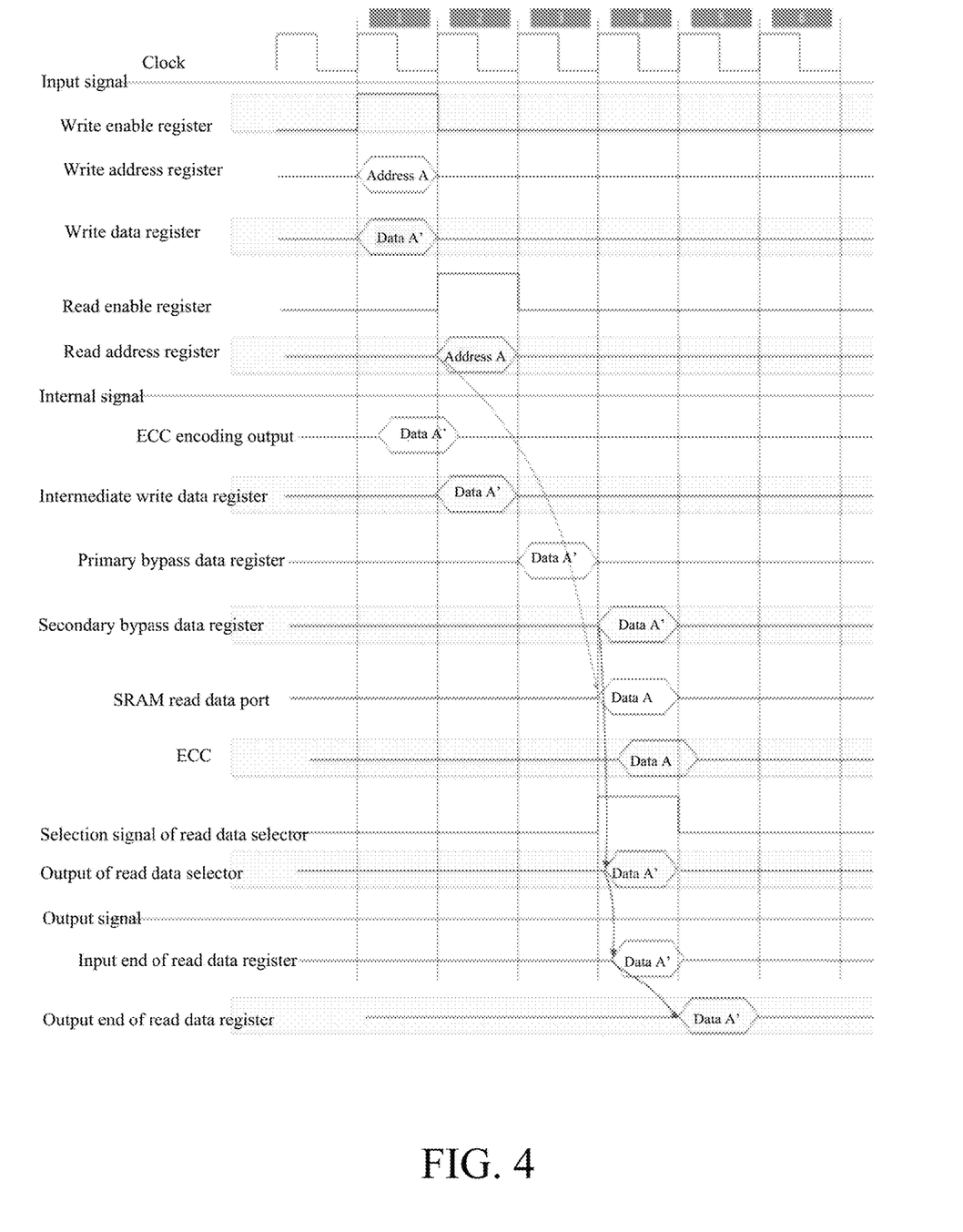
FIG. 4 shows a timing sequence diagram of the storage system for hiding ECC encoding delay shown in FIG. 3.

FIG. 4 shows a timing sequence diagram of a storage system for hiding ECC encoding delay shown in FIG. 3.

As shown in FIG. 4, 1, 2 . . . 6 marked on a clock signal are respectively the clock signal periods 1, 2 . . . 6. Those are only an example, and the clock signal includes more than just these six clock cycles. An address signal in a write address register is the address A, and a write input data in a write data register is the data A', wherein the data A' is a new input address corresponding to the address A, and the data A is original data corresponding to the address A.

In a possible embodiment, when the timing sequence of the intermediate write register module aligns with the timing sequence of the intermediate write data register, the intermediate write register module transmits the write data to the data input of the SRAM; and in concurrence with transmission to the write signal input of the SRAM of the write signal by the intermediate write register module, the intermediate write data register transmits the write data to the data input of the SRAM.

As shown in FIG. 3, in order to align the write enable signal and the write address signal with the write data, the intermediate write enable register is added between the write enable register and the SRAM, the intermediate write address register is added between the write address register and the SRAM, and the intermediate write data register is added between the write data register and the SRAM. After alignment of the write enable signal and the write address signal with the write data, the write enable signal and the write address signal are simultaneously transmitted with the write data to, respectively, the write signal input and the data input of the SRAM, thereby solving the problem of a timing sequence at a writing side of the SRAM resulting from the delay of the ECC encoding module.

In a possible embodiment, as shown in FIG. 4, the read register module is configured to transmit the read signal to the read signal input of the SRAM when the timing sequence of the intermediate write register module aligns with the timing sequence of the intermediate write data register.

During reading the data by the SRAM (namely writing the data to the SRAM), the SRAM reads the write enable signal in the write enable register in a clock signal period 1. When the write enable signal is valid (if the high level shown in FIG. 4 is valid), the address A and the data A' are simultaneously and respectively written to the write address register and the write data register and are further respectively transmitted to the intermediate write address register and the intermediate write data register.

As shown in FIG. 4, the ECC encoding module is connected to the output of the write data register. Due to delay at output of the ECC encoding module, in response to the write enable signal in the clock signal period 1, the write data is written to the intermediate write data register in delay. In order to avoid the problem of delay at the writing side of the SRAM resulting from the ECC encoding module, during the clock signal period 2, the write enable signal and the write address signal are aligned with the write data, namely the timing sequence of the intermediate write register module aligns with the timing sequence of the intermediate write data register.

For data read/write operation on the SRAM, read operation is performed during the next clock period in response to the write enable signal. During the clock signal period 2, namely when the timing sequence of the intermediate write register module aligns with the timing sequence of the intermediate write data register, the read register module transmits the read signal to the read signal input of the SRAM for the read operation.

In a possible embodiment, after the read register module transmits the read signal to the read data register for data reading, the write data is transmitted by the intermediate write data register to the primary bypass data register, and by the primary bypass data register to the secondary bypass data register, and selected by the read data selector.

As shown in FIG. 4, from the clock signal period 2 to the time of outputting the read data by the read data register (the clock signal period 5), an internal clock signal is delayed by two clock periods.

When the reading operation is performed by the read register module, during the clock signal period 4 of the internal clock signal, the data A can be directly read from a data read port of the SRAM, the data A is output to the ECC encoding module to check and correct errors in a check code of a data bit, and the data A is input to a second input of the read data selector by the ECC encoding module. During the clock signal period 5, the data A is output by the read data register.

If the read address is different from the write address (e.g., the address A in FIG. 4), the data A (the data A is not the original data corresponding to the address A) is the target data output by the read data register. If the read address is identical to the write address (e.g., the address A in FIG. 4), due to the output delay resulting from the ECC encoding module, the data A directly output by the output port of the SRAM is the original data corresponding to the address A, rather than the target data A' to be output by the read data register.

In order to avoid the delay in reading the data by the read data register at the same address resulting from the output delay of the ECC encoding module, the data A' is input from the intermediate write data register to the primary bypass data register during the clock signal period 3. The data A' is input from the primary bypass data register to the secondary bypass data register during the clock signal period 4. The data A' is also input to a first input of the read data selector. In this way, the data A' output from the bypass register module can be selected by the read data selector, so during the clock signal period 5, the read data register outputs the data A' to hide the delay resulting from the ECC module logic and solve the problem of the data reading error when data at the address is read right after the data is written to the address.

Since the read data register outputs different data during the data read/write operation on the SRAM when the read address is identical to or different from the write address, the read data selector can be set to select to output corresponding data.

In a possible embodiment, when the timing sequence of the intermediate write register module aligns with the timing sequence of the intermediate write data register, determine whether the write address signal is identical to the read address signal; if it is, the read data selector is configured to select to output the write data output from the bypass register module; and if it is not, the read data selector is configured to select output data of the ECC encoding error checking module.

As shown in FIG. 4, during the clock signal period 2 (the timing sequence of the intermediate write register module aligns with the timing sequence of the intermediate write data register), the address signal of the read address register is compared with the address A of the write address register; if they are identical, the read data selector is configured to select the output data from the bypass register module; and if it is not, the read data selector is configured to select output data of the ECC encoding error checking module. In this way, the data can be effectively read/written during the data read operation on the SRAM.

Figure 5:
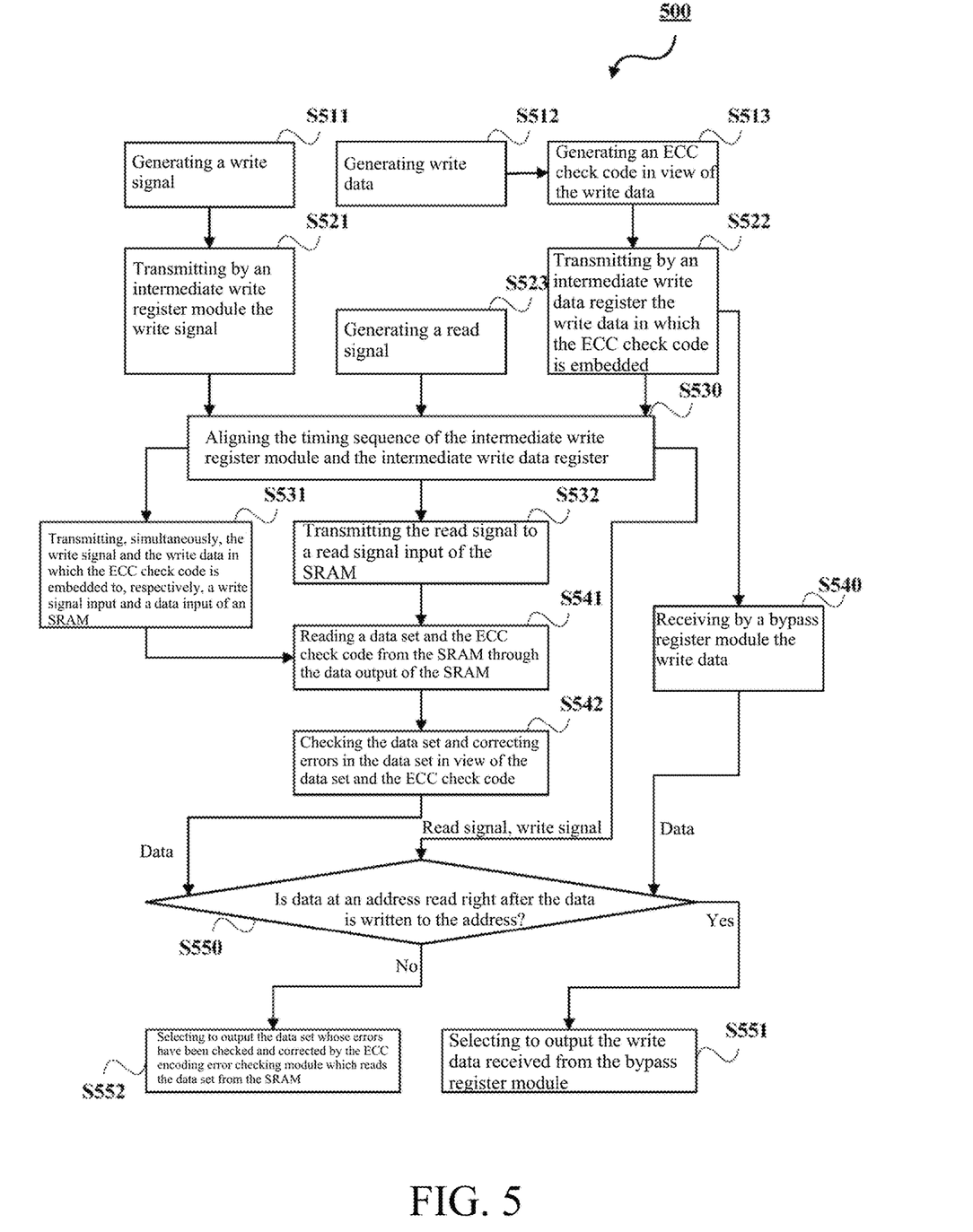
FIG. 5 shows a flow chart of a method for hiding ECC encoding delay provided in an embodiment according to the present disclosure.

FIG. 5 shows a flow chart of a method for hiding ECC encoding delay provided in an embodiment according to the present disclosure. As shown in FIG. 5, the method 500 is applied to the storage system, comprising:

S511: generating a write signal;
S512: generating write data;
S513: generating an ECC check code in view of the write data;
S521: transmitting by an intermediate write register module the write signal;
S522: transmitting by an intermediate write data register the write data in which the ECC check code is embedded;
S523: generating a read signal;
S531: when a timing sequence of the intermediate write register module aligns with a timing sequence of the intermediate write data register (S530), transmitting, simultaneously, the write signal and the write data in which the ECC check code is embedded to, respectively, a write signal input and a data input of an SRAM;
S532: when the timing sequence of the intermediate write register module aligns with the timing sequence of the intermediate write data register (S530), transmitting the read signal to a read signal input of the SRAM;
S540: receiving by a bypass register module the write data from the intermediate write data register and transmitting by the bypass register the write data;
S541: reading a data set and the ECC check code from the SRAM through the data output of the SRAM;
S542: checking the data set and correcting errors in the data set in view of the data set and the ECC check code; and
in response to the read signal and the write signal, when data at an address is read right after the data is written to the address (S550, branch "Yes"), selecting to output the write data received from the bypass register module (S551); but when data is written to an address but data at an other address is read (S550, branch "No"), selecting to output the data set whose errors have been checked and corrected by the ECC encoding error checking module which reads the data set from the SRAM (S552).
S542 further includes: if a multi-bit error is discovered, reporting the multi-bit error.

In the embodiment as shown in FIG. 3, the intermediate write register module includes an intermediate write enable register and an intermediate write address register, the write signal includes a write enable signal and a write address signal; the write signal input of the SRAM further includes a write enable signal input and a write address signal input. Therefore, S521 further includes: transmitting by the intermediate write enable register the write enable signal to the write enable signal input of the SRAM; and transmitting by the intermediate write address register the write address signal to the write address signal input of the SRAM.

In the embodiment as shown in FIG. 3, the bypass register module includes a primary bypass data register and a secondary bypass data register. Therefore, S540 further includes: receiving through the primary bypass data register the write data from the intermediate write data register and transmitting the write data; and receiving through the secondary bypass data register the write data from the primary bypass data register and transmitting the write data.

More specifically, after transmitting the read signal to the read signal input of the SRAM, the write data is: transmitted by the intermediate write data register to the primary bypass data register; transmitted by the primary bypass data register to the secondary bypass data register; and selected for outputting.

In the embodiment as shown in FIG. 3, the read signal includes a read enable signal and a read address signal; the read signal input of the SRAM further includes a read enable signal input and a read address signal input; and the read signal input which transmits the read signal to the SRAM includes a read enable signal input and a read address signal input for simultaneously transmitting the read enable signal and the read address signal to, respectively, the read enable signal input and the read address signal input of the SRAM.

Specifically, in S530, S550, S551 and S552, when a timing sequence of the intermediate write register module aligns with the timing sequence of the intermediate write data register, determining whether the write address signal is identical to the read address signal; if it is, selecting to output the write data received from the bypass register module; but if it is not, selecting to output the data set whose errors have been checked and corrected by the ECC encoding error checking module which reads the data set from the SRAM.

For example, as shown in FIG. 3 and FIG. 4, during the clock signal period 1, the SRAM reads the write enable signal, and when the high level of the write enable signal is valid, the write enable signal, the write address signal and the write data are respectively written to the write enable register, the write address register and the write data register, and the write enable signal and the write address signal are respectively written to the intermediate write enable register and the intermediate write address register. The input of the write data register is electrically connected to the ECC encoding module. Due to the write delay resulting from the logic of the ECC encoding module, during the clock signal period 2, timing sequences of the write enable signal and the write data signal are aligned with the time sequence of the write data through the intermediate write enable register, the intermediate write address register and the intermediate write data register, and are input into the write input of the SRAM. At this moment, the read register module transmits the read enable signal and the read address signal to the read signal input of the SRAM for the read operation.

During the clock signal period 3, the write data is input from the intermediate write data register to the primary bypass data register; during the clock signal period 3, the write data is input from the primary bypass data register to the secondary bypass data register, and input to the read data selector. Subsequently, determine whether the read address signal is identical to the write address signal, for example, a signal 00 may be used to indicate that the read address signal is identical to the write address signal, and a signal 01 is used to indicate that the read address signal is different from the write address signal. The read data register selects to output corresponding data to the read data register in view of the received signal. During the clock signal period 5, if the read address signal is identical to the write address signal (signal 00), the read data register reads to output the data output from the bypass register module, otherwise (signal 01) reads to output the data output from the ECC encoding error checking module. By adding the intermediate register at the input and by adding the bypass register logic module at the read end, the ECC encoding delay at the input can be effectively hid, the impact of the ECC encoding delay on the write delay of the SRAM can be avoided, and the problem of a data reading error when data at an address is read right after the data is written to the address can be solved.

The storage system and method according to the present disclosure are applicable to a central processing unit (CPU), a graphics processing unit (GPU), a field programmable gate array (FPGA), a digital signal processor (DSP), artificial intelligence (AI), and a video codec (Video Codec) chip, etc.

The above-mentioned embodiments according to the present disclosure are exemplary, in exhaustive, and nonrestrictive. Without the departure from the scope and spirit of the embodiments, many modifications and changes are obvious for those skilled in the art. All terms are selected and used for the present disclosure to best explain the principle and actual application of the embodiments and the improvement of the previous art, or help those skilled in the art to understand the embodiments according to the present disclosure.

INDUSTRIAL APPLICABILITY

The present disclosure relates a storage system and method for hiding error checking and correcting (ECC) encoding delay. According to the present disclosure, the output of a data register is configured to be two data streams. One data stream transmits the input write data and the ECC check code to the SRAM through the ECC encoding module and the intermediate write data register; and the other data stream inputs the input write data to a read data selector through the bypass register module through the intermediate write data register and the bypass register module. The other input of the read data selector is the data set whose errors have been checked and corrected by the ECC encoding error checking module which reads the data set from the SRAM. The read data selector is configured to transmit the selected input data to the read data register. According to the present disclosure, when data at the address is read right after the data is written to the address, the read data selector selects to output the write data received from the bypass register module; but when data is written to an address but data at an other address is read, the read data selector selects to output the data set whose errors have been checked and corrected by the ECC encoding error checking module which reads the data set from the SRAM.

Additionally, it may be understood that the storage system and method for hiding Error Checking and Correcting (ECC) encoding delay according to the present disclosure may be reproduced, and used for various industrial applications. For example, the storage system and method for hiding Error Checking and Correcting (ECC) encoding delay according to the present disclosure may be used for the field of the computing data storage.

What is claimed is:

1. A storage system for hiding error checking and correcting (ECC) encoding delay, comprising:
   a static random access memory (SRAM), which includes a data input, a write signal input, a read signal input and a data output;
   a write register module, which is configured to output a write signal;
   an intermediate write register module, which is configured to receive the write signal from the write data register module and then transmit the write signal to the write signal input of the SRAM;
   a write data register, which is configured to output write data;
   an ECC coding module, which is configured to receive the write data from the write data register and to generate an ECC check code in view of the write data;
   an intermediate write data register, which is configured to:
     receive the write data from the write data register;
     receive the ECC check code from the ECC coding module; and
     transmit the write data and the ECC check code to the data input of the SRAM;

a bypass register module, which is configured to receive the write data from the intermediate write data register;

a read register module, which is configured to transmit a read signal to the read signal input of the SRAM;

an ECC encoding error checking module, which is configured to:
  read a data set and the ECC check code from the SRAM through the data output of the SRAM;
  check the data set; and
  correct errors in the data set in view of the data set and the ECC check code;

a read data selector, which includes a first input and a second input, wherein:
the first input is configured to receive the write data from the bypass register module;
  the second input is configured to receive from the ECC encoding error checking module the data set which is read from the SRAM; and
  the read data selector is configured to output what is selected from one of what is received by the first input and what is received by the second input; and a read data register, which is configured to receive what is outputted from the read data selector, wherein:

when a timing sequence of the intermediate write register module aligns with a timing sequence of the intermediate write data register:
  the intermediate write register module is configured to transmit the write signal to the write signal input of the SRAM;
  the intermediate write data register is configured to, in concurrence with transmission to the write signal input of the SRAM of the write signal by the intermediate write register module, transmit the write data to the data input of the SRAM; and
  the read register module is configured to transmit the read signal to the read signal input of the SRAM; and in response to the read signal and the write signal:
  when data at an address is read right after the data is written to the address, the read data selector is configured to select to output the write data received from the bypass register module; but
  when data is written to an address but data at an other address is read, a data set selector is configured to select to output the data set whose errors have been checked and corrected by the ECC encoding error checking module which reads the data set from the SRAM.

2. The storage system in claim 1, wherein:
an input of the ECC encoding error checking module is electrically connected to the data output of the SRAM; and
an output of the ECC encoding error checking module is electrically connected to the second input of the read data selector.

3. The storage system in claim 2, wherein: if a multi-bit error is discovered, the ECC encoding error checking module is further configured to report the multi-bit error.

4. The storage system in claim 1, wherein:
the write register module includes a write enable register and a write address register;
the intermediate write register module includes an intermediate write enable register and an intermediate write address register;
the write signal includes a write enable signal and a write address signal;
the write signal input of the SRAM includes a write enable signal input and a write address signal input;
the write enable register is electrically connected to the intermediate write enable register;
the intermediate write enable register, which is configured to input the write enable signal to the SRAM, is electrically connected to the write enable signal input of the SRAM;
the write address register is electrically connected to the intermediate write address register; and
the intermediate write address register, which is configured to input the write address signal to the SRAM, is electrically connected to the write address signal input of the SRAM.

5. The storage system in claim 1, wherein:
the bypass register module includes a primary bypass data register and a secondary bypass data register;
the primary bypass data register is configured to receive the write data from the intermediate write data register;
the secondary bypass data register is configured to receive the write data from the primary bypass data register; and
the first input of the read data selector is configured to receive the write data from the secondary bypass data register.

6. The storage system in claim 5, wherein:
an input of the primary bypass data register is electrically connected to an output of the intermediate write data register;
an input of the secondary bypass data register is electrically connected to an output of the primary bypass data register; and
an output of the secondary bypass data register is electrically connected to the first input of the read data selector.

7. The storage system in claim 6, wherein after the read register module transmits the read signal to the read signal input of the SRAM, the write data is:
transmitted by the intermediate write data register to the primary bypass data register;
transmitted by the primary bypass data register to the secondary bypass data register; and
selected by the read data selector.

8. The storage system in claim 7, wherein:
the read register module includes a read enable register and a read address register;
the read signal includes a read enable signal and a read address signal;
the read signal input of the SRAM further includes a read enable signal input and a read address signal input; and
the read signal input which transmits the read signal to the SRAM includes the read enable signal input and the read address signal input for simultaneously transmitting the read enable signal and the read address signal to, respectively, the read enable signal input and the read address signal input of the SRAM.

9. The storage system in claim 8, wherein when a timing sequence of the intermediate write register module aligns with a timing sequence of the intermediate write data register:
determine whether a write address signal is identical to the read address signal;
if it is, the read data selector is configured to select to output the write data received from the bypass register module; but
if it is not, the read data selector is configured to select to output the data set whose errors have been checked and corrected by the ECC encoding error checking module which reads the data set from the SRAM.

10. A method for hiding error checking and correcting (ECC) encoding delay, comprising steps of:
S1) generating a write signal;
S2) generating write data;
S3) generating an ECC check code in view of the write data;
S4) transmitting by an intermediate write register module the write signal;
S5) transmitting by an intermediate write data register the write data in which the ECC check code is embedded;
S6) generating a read signal;
S7) when a timing sequence of the intermediate write register module aligns with a timing sequence of the intermediate write data register:
  transmitting, simultaneously, the write signal and the write data in which the ECC check code is embedded to, respectively, a write signal input and a data input of a static random access memory (SRAM); and
  transmitting the read signal to a read signal input of the SRAM;
S8) receiving by a bypass register module the write data from the intermediate write data register and transmitting by the bypass register module the write data;
S9) reading a data set and the ECC check code from the SRAM through a data output of the SRAM;
S10) checking the data set and correcting errors in the data set in view of the data set and the ECC check code; and
S11) in response to the read signal and the write signal:
  when data at an address is read right after the data is written to the address, selecting to output the write data received from the bypass register module; but
  when data is written to an address but data at an other address is read, selecting to output the data set whose errors have been checked and corrected by an ECC encoding error checking module which reads the data set from the SRAM.

11. The method in claim 10, wherein S10 includes: if a multi-bit error is discovered, reporting the multi-bit error.

12. The method in claim 10, wherein:
the intermediate write register module includes an intermediate write enable register and an intermediate write address register;
the write signal includes a write enable signal and a write address signal;
the write signal input of the SRAM includes a write enable signal input and a write address signal input; and
S4 includes:
  transmitting by the intermediate write enable register the write enable signal to the write enable signal input of the SRAM; and
  transmitting by the intermediate write address register the write address signal to the write address signal input of the SRAM.

13. The method in claim 10, wherein:
the bypass register module includes a primary bypass data register and a secondary bypass data register; and
S8 includes:
  receiving through the primary bypass data register the write data from the intermediate write data register and transmitting the write data; and
  receiving through the secondary bypass data register the write data from the primary bypass data register and transmitting the write data.

14. The method in claim 13, wherein after transmitting the read signal to the read signal input of the SRAM, the write data is:
transmitted by the intermediate write data register to the primary bypass data register;
transmitted by the primary bypass data register to the secondary bypass data register; and
selected for outputting.

15. The method in claim 14, wherein:
the read signal includes a read enable signal and a read address signal;
the read signal input of the SRAM further includes a read enable signal input and a read address signal input; and
the read signal input which transmits the read signal to the SRAM includes the read enable signal input and the read address signal input for simultaneously transmitting the read enable signal and the read address signal to, respectively, the read enable signal input and the read address signal input of the SRAM.

16. The method in claim 15, wherein when a timing sequence of the intermediate write register module aligns with a timing sequence of the intermediate write data register:
determining whether a write address signal is identical to the read address signal;
if it is, selecting to output the write data received from the bypass register module; but
if it is not, selecting to output the data set whose errors have been checked and corrected by the ECC encoding error checking module which reads the data set from the SRAM.

* * * * *